United States Patent
Suffin

(10) Patent No.: US 6,691,257 B1
(45) Date of Patent: Feb. 10, 2004

(54) FAULT-TOLERANT MAINTENANCE BUS PROTOCOL AND METHOD FOR USING THE SAME

(75) Inventor: A. Charles Suffin, West Boylston, MA (US)

(73) Assignee: Stratus Technologies Bermuda Ltd., Hamilton (BM)

(*) Notice: Subject to any disclaimer, the term of this patent is extended or adjusted under 35 U.S.C. 154(b) by 0 days.

(21) Appl. No.: 09/548,202

(22) Filed: Apr. 13, 2000

(51) Int. Cl.[7] .............................................. G06F 11/00
(52) U.S. Cl. ...................................................... 714/43
(58) Field of Search ................................ 714/43, 56, 2, 714/3, 7, 5, 35, 48, 49, 52; 710/100, 120, 119, 312, 306, 311

(56) References Cited

U.S. PATENT DOCUMENTS

| | | | |
|---|---|---|---|
| 3,544,973 A | 12/1970 | Borck, Jr. et al. | 340/172.5 |
| 3,548,176 A | 12/1970 | Shutler | 235/153 |
| 3,641,505 A | 2/1972 | Artz et al. | 340/172.5 |
| 3,710,324 A | 1/1973 | Cohen et al. | 340/172.5 |
| 3,736,566 A | 5/1973 | Anderson et al. | 340/172.5 |
| 3,795,901 A | 3/1974 | Boehm et al. | 340/172.5 |
| 3,805,039 A | 4/1974 | Stiffler | 235/153 AE |
| 3,820,079 A | 6/1974 | Bergh et al. | 340/172.5 |
| 3,840,861 A | 10/1974 | Amdahl et al. | 340/172.5 |
| 3,997,896 A | 12/1976 | Cassarino, Jr. et al. | 340/172.5 |
| 4,015,246 A | 3/1977 | Hopkins, Jr. et al. | 340/172.5 |
| 4,032,893 A | 6/1977 | Moran | 340/166 R |
| 4,059,736 A | 11/1977 | Perucca et al. | 179/175.2 R |
| 4,128,883 A | 12/1978 | Duke et al. | 364/200 |
| 4,228,496 A | 10/1980 | Katzman et al. | 364/200 |
| 4,245,344 A | 1/1981 | Richter | 371/68 |
| 4,263,649 A | 4/1981 | Lapp, Jr. | 364/200 |
| 4,275,440 A | 6/1981 | Adams, Jr. et al. | 364/200 |
| 4,309,754 A | 1/1982 | Dinwiddie, Jr. et al. | 364/200 |
| 4,366,535 A | 12/1982 | Cedolin et al. | 364/200 |
| 4,434,463 A | 2/1984 | Quinquis et al. | 364/200 |
| 4,449,182 A | 5/1984 | Rubinson et al. | 364/200 |
| 4,453,215 A | 6/1984 | Reid | 364/200 |
| 4,467,436 A | 8/1984 | Chance et al. | 364/513 |
| 4,484,273 A | 11/1984 | Stiffler et al. | 364/200 |

(List continued on next page.)

FOREIGN PATENT DOCUMENTS

| | | | |
|---|---|---|---|
| EP | 0 301 499 A2 | 2/1989 | G06F/11/16 |
| EP | 0 428 330 A2 | 5/1991 | G06F/13/30 |
| EP | 0 475 005 B1 | 11/1995 | G06F/15/16 |
| EP | 0 293 860 B1 | 2/1996 | G06F/13/28 |
| EP | 0 390 567 B1 | 6/1999 | H04L/29/06 |
| GB | 2 060 229 A2 | 4/1981 | G06F/3/00 |
| WO | WO 97/24677 | 7/1997 | G06F/13/00 |
| WO | WO 98/21660 | 5/1998 | G06F/13/00 |
| WO | WO 99/59066 | 11/1999 | G06F/11/20 |
| WO | WO 99/66410 | 12/1999 | G06F/11/22 |

Primary Examiner—Scott Baderman
Assistant Examiner—Gabriel Chu
(74) Attorney, Agent, or Firm—Testa, Hurwitz & Thibeault, LLP

(57) ABSTRACT

A fault-tolerant maintenance bus protocol and method for using the same enables communication between a command module located on a parent maintenance bus and a plurality of subsystem components joined together on a child maintenance bus. The child maintenance bus is interconnected to a bridge assembly that directs messages formatted in the protocol between the subsystem components and the command module through the bridge. The protocol includes a command message structure that uniquely addresses the bridge assembly. It also includes a command string, a command data string for communicating with one of the subsystem components and a command error-checking string. A response message structure is generated by the bridge in response to a command message. The response message uniquely addresses the command module. It includes error and status strings with respect to execution of the command message, a response data string for communicating with the command module and a response error-checking string.

17 Claims, 5 Drawing Sheets

U.S. PATENT DOCUMENTS

| | | | |
|---|---|---|---|
| 4,486,826 A | 12/1984 | Wolff et al. | 364/200 |
| 4,503,496 A | 3/1985 | Holzner et al. | 364/200 |
| 4,543,628 A | 9/1985 | Pomfret | 364/200 |
| 4,590,554 A | 5/1986 | Glazer et al. | 364/200 |
| 4,597,084 A | 6/1986 | Dynneson et al. | 371/51 |
| 4,608,631 A | 8/1986 | Stiffler et al. | 364/200 |
| 4,628,447 A | 12/1986 | Cartret et al. | 364/200 |
| 4,630,193 A | 12/1986 | Kris | 364/200 |
| 4,633,394 A | 12/1986 | Georgiou et al. | 364/200 |
| 4,654,857 A | 3/1987 | Samson et al. | 371/68 |
| 4,669,056 A | 5/1987 | Waldecker et al. | 364/900 |
| 4,669,079 A | 5/1987 | Blum | 370/85 |
| 4,700,292 A | 10/1987 | Campanini | 364/200 |
| 4,703,420 A | 10/1987 | Irwin | 364/200 |
| 4,750,177 A | 6/1988 | Hendrie et al. | 371/32 |
| 4,805,091 A | 2/1989 | Thiel et al. | 364/200 |
| 4,809,169 A | 2/1989 | Sfarti et al. | 364/200 |
| 4,816,990 A | 3/1989 | Williams | 364/200 |
| 4,827,409 A | 5/1989 | Dickson | 364/200 |
| 4,866,604 A | 9/1989 | Reid | 364/200 |
| 4,869,673 A | 9/1989 | Kreinberg et al. | 439/64 |
| 4,914,580 A | 4/1990 | Jensen et al. | 364/200 |
| 4,916,695 A | 4/1990 | Ossfeldt | 371/9.1 |
| 4,926,315 A | 5/1990 | Long et al. | 364/200 |
| 4,931,922 A | 6/1990 | Baty et al. | 364/200 |
| 4,939,643 A | 7/1990 | Long et al. | 364/200 |
| 4,974,144 A | 11/1990 | Long et al. | 364/200 |
| 4,974,150 A | 11/1990 | Long et al. | 364/200 |
| 4,985,830 A | 1/1991 | Atac et al. | 364/200 |
| 4,994,960 A | 2/1991 | Tuchler et al. | 364/200 |
| 5,005,174 A | 4/1991 | Bruckert et al. | 371/68.3 |
| 5,083,258 A | 1/1992 | Yamasaki | 395/725 |
| 5,099,485 A | 3/1992 | Bruckert et al. | 371/68.3 |
| 5,117,486 A | 5/1992 | Clark et al. | 395/250 |
| 5,138,257 A | 8/1992 | Katsura | 324/158 R |
| 5,179,663 A | 1/1993 | Iimura | 395/250 |
| 5,243,704 A | 9/1993 | Baty et al. | 395/325 |
| 5,247,522 A | 9/1993 | Reiff | 371/29.5 |
| 5,251,303 A | 10/1993 | Fogg, Jr. et al. | 395/275 |
| 5,270,699 A | 12/1993 | Signaigo et al. | 340/825.01 |
| 5,295,258 A | 3/1994 | Jewett et al. | 395/575 |
| 5,313,627 A | 5/1994 | Amini et al. | 395/575 |
| 5,317,726 A | 5/1994 | Horst | 395/575 |
| 5,345,566 A * | 9/1994 | Tanji et al. | 710/306 |
| 5,428,766 A | 6/1995 | Seaman | 395/575 |
| 5,463,755 A | 10/1995 | Dumarot et al. | 395/475 |
| 5,465,340 A | 11/1995 | Creedon et al. | 395/846 |
| 5,537,535 A | 7/1996 | Maruyama et al. | 395/183.01 |
| 5,550,986 A | 8/1996 | DuLac | 395/280 |
| 5,555,372 A | 9/1996 | Tetreault et al. | 395/182.13 |
| 5,574,865 A | 11/1996 | Hashemi | 395/283 |
| 5,584,030 A | 12/1996 | Husak et al. | 395/750 |
| 5,600,784 A | 2/1997 | Bissett et al. | 395/182.1 |
| 5,613,162 A | 3/1997 | Kabenjian | 395/842 |
| 5,627,965 A | 5/1997 | Liddell et al. | 395/185.01 |
| 5,630,046 A | 5/1997 | Loise | 395/182.09 |
| 5,630,056 A | 5/1997 | Horvath et al. | 395/185.09 |
| 5,659,681 A | 8/1997 | Ojima | 395/183.19 |
| 5,671,443 A | 9/1997 | Stauffer et al. | 395/845 |
| 5,696,905 A | 12/1997 | Reimer et al. | 395/227 |
| 5,701,410 A | 12/1997 | BeMent et al. | 395/183.19 |
| 5,701,457 A | 12/1997 | Fujiwara | 395/608 |
| 5,737,601 A | 4/1998 | Jain et al. | 395/617 |
| 5,751,955 A | 5/1998 | Sonnier et al. | 395/200.19 |
| 5,758,065 A | 5/1998 | Reams et al. | 395/185.01 |
| 5,809,256 A | 9/1998 | Najemy | 395/283 |
| 5,812,748 A | 9/1998 | Ohran et al. | 395/182.02 |
| 5,815,647 A | 9/1998 | Buckland et al. | 395/182.01 |
| 5,828,903 A | 10/1998 | Sethuram et al. | 395/817 |
| 5,838,899 A | 11/1998 | Leavitt et al. | 395/185.09 |
| 5,838,900 A | 11/1998 | Horvath et al. | 395/185.09 |
| 5,838,993 A | 11/1998 | Riley et al. | 395/842 |
| 5,862,145 A | 1/1999 | Grossman et al. | 371/5.1 |
| 5,870,301 A | 2/1999 | Yakushiji et al. | 364/132 |
| 5,875,308 A | 2/1999 | Egan et al. | 395/283 |
| 5,875,351 A | 2/1999 | Riley | 395/842 |
| 5,881,251 A | 3/1999 | Fung et al. | 395/283 |
| 5,884,027 A | 3/1999 | Garbus et al. | 395/200.8 |
| 5,890,003 A | 3/1999 | Cutts, Jr. et al. | 395/736 |
| 5,892,928 A | 4/1999 | Wallach et al. | 395/283 |
| 5,894,560 A | 4/1999 | Carmichael et al. | 395/845 |
| 5,923,840 A * | 7/1999 | Desnoyers et al. | 714/48 |
| 5,928,339 A | 7/1999 | Nishikawa | 710/26 |
| 5,944,800 A | 8/1999 | Mattheis et al. | 710/23 |
| 5,953,538 A | 9/1999 | Duncan et al. | 395/842 |
| 5,956,474 A | 9/1999 | Bissett et al. | 395/182.09 |
| 5,956,476 A | 9/1999 | Ranson et al. | 395/182.06 |
| 5,978,866 A | 11/1999 | Nain | 710/22 |
| 5,982,672 A | 11/1999 | Moon et al. | 365/189.01 |
| 5,983,289 A | 11/1999 | Ishikawa et al. | 710/35 |
| 5,991,844 A * | 11/1999 | Khosrowpour | 710/312 |
| 5,991,900 A | 11/1999 | Garnett | 714/56 |
| 5,996,035 A | 11/1999 | Allen et al. | 710/103 |
| 6,000,043 A | 12/1999 | Abramson | 714/44 |
| 6,009,535 A | 12/1999 | Halligan et al. | 714/5 |
| 6,012,120 A | 1/2000 | Duncan et al. | 710/129 |
| 6,021,456 A | 2/2000 | Herdeg et al. | 710/260 |
| 6,026,458 A | 2/2000 | Rasums | 710/103 |
| 6,032,266 A * | 2/2000 | Ichinohe et al. | 714/9 |
| 6,032,271 A | 2/2000 | Goodrum et al. | 714/56 |
| 6,041,375 A | 3/2000 | Bass et al. | 710/103 |
| 6,047,343 A | 4/2000 | Olarig | 710/102 |
| 6,049,894 A | 4/2000 | Gates | 714/41 |
| 6,055,584 A | 4/2000 | Bridges et al. | 710/27 |
| 6,062,480 A | 5/2000 | Evoy | 235/492 |
| 6,073,196 A | 6/2000 | Goodrum et al. | 710/103 |
| 6,098,137 A | 8/2000 | Goodrum et al. | 710/129 |
| 6,125,417 A | 9/2000 | Bailis et al. | 710/103 |
| 6,134,679 A * | 10/2000 | Liddell et al. | 714/49 |
| 6,141,769 A | 10/2000 | Petivan et al. | 714/10 |
| 6,154,802 A * | 11/2000 | Khosrowpour | 710/312 |
| 6,173,312 B1 * | 1/2001 | Atarashi et al. | 709/203 |
| 6,202,115 B1 * | 3/2001 | Khosrowpour | 710/312 |
| 6,260,159 B1 * | 7/2001 | Garnett et al. | 714/15 |
| 6,321,286 B1 * | 11/2001 | Goodrum et al. | 710/311 |
| 6,338,150 B1 * | 1/2002 | Johnson et al. | 714/39 |
| 6,397,345 B1 * | 5/2002 | Edmonds et al. | 714/4 |
| 6,430,710 B1 * | 8/2002 | Moriyama et al. | 714/43 |
| 6,530,043 B1 * | 3/2003 | Beardsley et al. | 714/52 |
| 6,536,000 B1 * | 3/2003 | Jackson et al. | 714/57 |
| 6,557,121 B1 * | 4/2003 | McLaughlin et al. | 714/44 |

* cited by examiner

FAULT-TOLERANT MAINTENANCE BUS PROTOCOL AND METHOD FOR USING THE SAME

BACKGROUND OF THE INVENTION

1. Field of the Invention

This invention relates to fault-tolerant computer systems and more particularly to a protocol transmitted over dedicated maintenance bus for use with such computer systems.

2. Background Information

Fault-tolerant computer systems are employed in situations and environments that demand high reliability and minimal downtime. Such computer systems may be employed in the tracking of financial markets, the control and routing of telecommunications and in other mission-critical functions such as air traffic control.

A common technique for incorporating fault-tolerance into a computer system is to provide a degree of redundancy to various components. In other words, important components are often paired with one or more backup components of the same type. As such, two or more components may operate in a so-called lockstep mode in which each component performs the same task at the same time, while only one is typically called upon for delivery of information. Where data collisions, race conditions and other complications may limit the use of lockstep architecture, redundant components may be employed in a failover mode. In failover mode, one component is selected as a primary component that operates under normal circumstances. If a failure in the primary component is detected, then the primary component is bypassed and the secondary (or tertiary) redundant component is brought on line. A variety of initialization and switchover techniques are employed to make a transition from one component to another during runtime of the computer system. A primary goal of these techniques is to minimize downtime and corresponding loss of function and/or data.

Fault-tolerant computer systems are often costly to implement since many commercially available components are not specifically designed for use in redundant systems. It is desirable to adapt conventional components and their built-in architecture whenever possible. All modern computer systems have particular capabilities directed to control and monitoring of functions. For example, large microprocessor chips such as the Pentium III™, available from Intel Corporation of Santa Clara, Calif., are designed to operate within a specific temperature range that is monitored by a commercially available environmental/temperature-sensing chip. One technique for interconnecting such an environmental monitor or other monitoring and control devices is to utilize a dedicated maintenance bus. The maintenance bus is typically separate system's main data and control bus structure. The maintenance bus generally connects to a single, centralized point of control, often implemented as a peripheral component interconnect (PCI) device.

However, as discussed above, conventional maintenance bus architecture is not specifically designed for redundant operation. Accordingly, prior fault-tolerant systems have utilized a customized architecture for transmitting monitor and control signals over the system's main buses (or dedicated proprietary buses) using, for example, a series of application specific integrated circuits (ASICs) mounted on each circuit board being monitored. To take advantage of current, commercially available maintenance bus architecture in a fault tolerant computing environment, a more comprehensive and cost-effective approach is needed.

Accordingly, it is an object of this invention to provide a protocol for use with a maintenance bus architecture that displays a high-degree of fault-tolerance. This maintenance bus architecture and associated protocol should be interoperable with commercially available components and should allow a fairly high degree of versatility in terms of monitoring and control of important computer system components.

SUMMARY OF THE INVENTION

This invention overcomes the disadvantages of the prior art by providing a protocol that is instantiated on a fault-tolerant maintenance bus architecture. The architecture includes two maintenance buses interconnecting each of a plurality of printed circuit boards, termed "parent" circuit boards. The two maintenance buses are each connected to a pair of system management modules (SMMs) that are configured to perform a variety of maintenance bus activities. The SMM can comprise any acceptable device for driving commands according to the protocol on the maintenance bus arrangement. The SMM has general knowledge of the circuit boards and their components. According to a preferred embodiment, the protocol is formatted to operate in accordance with Philips Semiconductors' $I^2C$ maintenance bus standard. Other standards are expressly contemplated. Within each parent board are a pair of redundant bridges both having a unique address. One bridge is connected to the first maintenance bus while a second bridge is connected to the second maintenance bus of the pair. A child maintenance bus interconnects the two bridges through a "child" printed circuit board. The introduction of a separate board to implement the child maintenance bus can be useful, but is not essential according to this invention. The child maintenance bus is itself interconnected with a variety of monitor and control functions on maintenance bus-compatible subsystem components. Using the protocol, the SMMs can address components on each child printed circuit board individually and receive appropriate responses therefrom based upon appropriate response identifiers within the protocol. In the event of a bus or bridge failure, the SMM can still communicate with the child subsystem components via the redundant bus and bridge.

The protocol includes a unique data packet structure. The command message initiated by the SMM includes a target bridge header, a command byte (wherein a non-zero byte code designates the message as a command rather than a response), the message size and a unique originator tag value. The command message further includes one or more bytes of forwarding data for subordinate bridges on the child bus (leading to and from remote components/circuitry). Next the command message has a response byte code to direct responses on the return trip through the bridge. The command message also includes one or more bytes of data to identify, and be used by, subsystem components. Finally the command message includes one checksum byte meant to sum up all previous message bytes.

A similar message packet is provided by the bridge in response to the command message. The response includes an SMM address byte and a zero-value command byte (indicating a response). Also provided is a byte indicating the overall message size in bytes and the identical tag originally provided in the command packet. The tags allow the SMM to verify that the response is to a particular transmitted command. A one-byte status code field and one-byte error message field are also provided. Unique status codes and error messages are generated by the bridge if a formatted message is incorrect or commanded action was not (or may not have been) taken by the subsystem. One or more bytes of response data delivered from the subsystem component or bridge is also provided in the response message. Finally, a checksum byte is provided for error checking.

Command message/data packets are transmitted by the SMM to be received by an appropriate component within a given time frame. If an expected response message/data packet is not returned from the component as expected, the SMM "times-out" and performs various error procedures that may include an alarm condition, system shut-down and/or retransmission of the packet.

The bridge can include an interconnection to a further bridge. This remote bridge can, itself, be interconnected to additional microprocessors and associated memory. The remote bridge is addressed through one of the parent board's bridges so the communication to and from the SMM can occur. The forwarding data of the command packet enables the packets to be transferred through these further bridges, while stored response data in each subordinate bridge is used to route the return of a response back to the originating SMM.

The SMM can be interconnected with a variety of other computer system peripherals and components, and can be accessed over a local network or through an Internet-based communication network.

BRIEF DESCRIPTION OF THE DRAWINGS

The foregoing and other objects and advantages of the invention will become more clear with reference to the following detailed description as illustrated by the drawings in which.

DETAILED DESCRIPTION OF AN ILLUSTRATIVE EMBODIMENT

Figure 1:
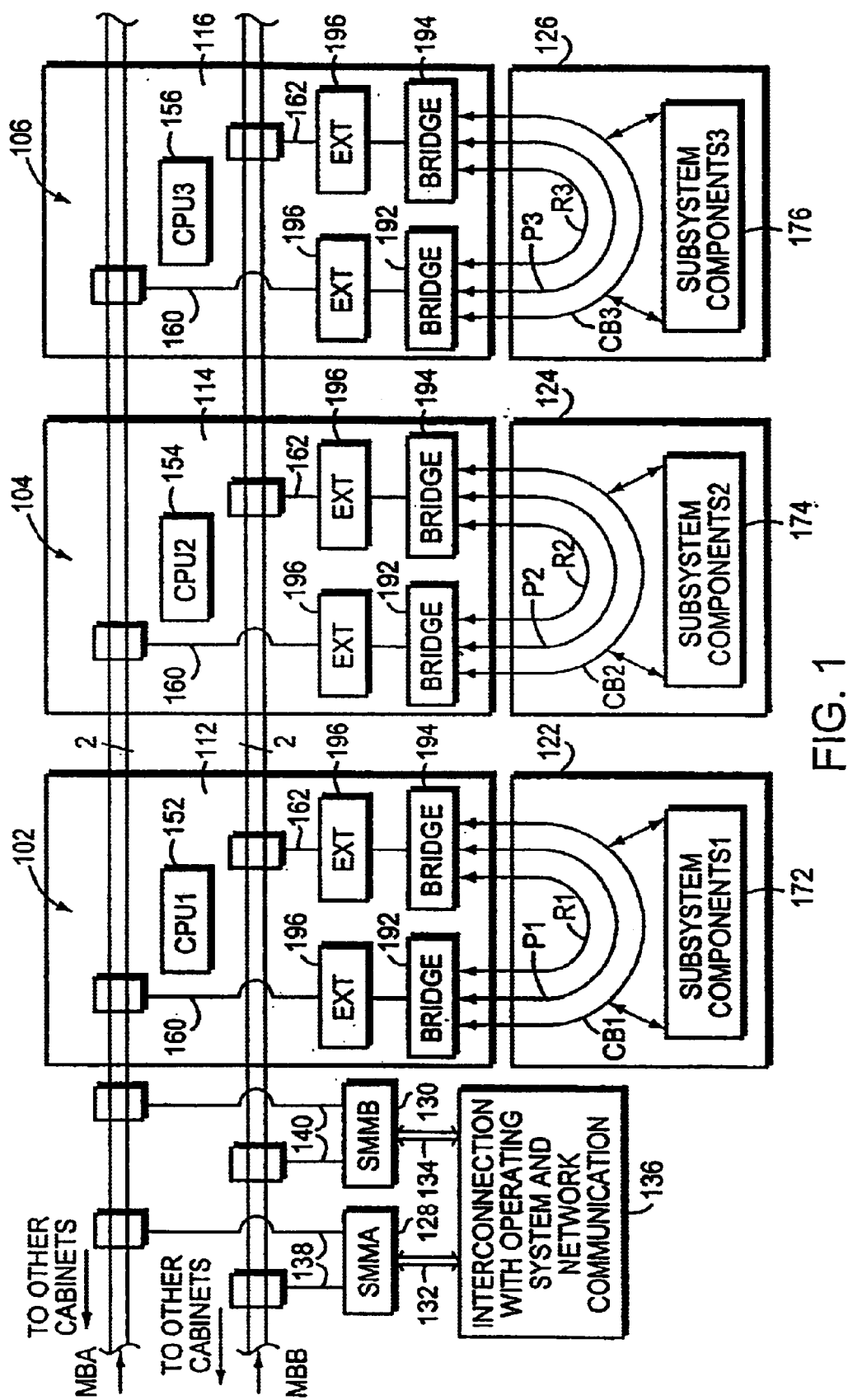
FIG. 1 is a block diagram showing an overview of a fault-tolerant maintenance bus architecture utilizing the maintenance bus protocol according to this invention.

FIG. 1 details a fault-tolerant maintenance bus architecture adapted to use a protocol according to a preferred embodiment of this invention. Before discussing the protocol in detail, the underlying maintenance bus architecture will be explained. The architecture and associated hardware according to an embodiment of this invention is shown and described individually in the co-pending, commonly owned US Patent Application Serial No. 09/548,536, entitled Fault-Tolerant Maintenance Bus Architecture by A. Charles Suffin, et al, which is expressly incorporated herein by reference.

A pair of parent maintenance buses MBA and MBB are shown. These maintenance buses are identical in architecture and can be implemented as a combination of cables, circuitry and circuit board traces. The buses MBA and MBB interconnect with a plurality of input/output (I/O) slots and pin locations within a cabinet that may contain a plurality of circuit boards. The parent maintenance buses MBA and MBB can also jump between cabinets in a larger computer system. It is generally contemplated that the buses are implemented in a multi-cabinet fault-tolerant server system, but the architecture according to this invention can be utilized in a variety of fault-tolerant computing configurations. According to a preferred embodiment, the buses MBA and MBB are each two-wire buses designed to take advantage of integrated circuit components utilizing the I$^2$C bus standard. The I$^2$C bus is a proprietary design of Philips Semiconductors of the Netherlands. This standard has become widely adopted for consumer electronics and various circuit applications, and is now supported by a large number of commercially available monitoring and control devices. Details on the use of the I$^2$C bus can be found in the I$_2$C-bus and how to use it (including specifications), April 1995 update, Chapter 3 by Philips Semiconductors. Typically, the bus is clocked at a speed of approximately 10 Kbytes/Sec. While I$^2$C is employed as the bus standard according to a preferred embodiment of this invention, it is expressly contemplated that other maintenance bus standards can be utilized according to the teachings of this invention with appropriate modifications.

To avoid signal loss over long distances, the parent buses MBA and MBB are amplified to generate a signal at 5 V×30 mA. A variety of bus amplification circuits can be used. In particular, commercially available hardware bus extenders are employed. The amplified bus operates at a gain that is ten times the normal operating range for an I$^2$C bus (5 V×30 mA). As described further below, this difference in operating level between the parent bus and various circuit components is compensated-for (on both sides) using the extender hardware.

In FIG. 1, three circuit board assemblies 102, 104 and 106 are shown. Each of these circuit board assemblies is interconnected with the bus pair (MBA and MBB). These board assemblies can represent a variety of computer system components. For example, the boards can together comprise a set of redundant identical boards or a set of separate functions including a central processing unit (CPU) board, "front panel" board and input/output (I/O) board. Each board assembly 102, 104 and 106 is defined functionally as a parent printed circuit board 112, 114 and 116 and an associated child printed circuit board 122, 124 and 126. As discussed above, while a separate board to implement the child maintenance bus can be useful according to an embodiment of this invention, it is not required. In general, the division between the parent board and child board is somewhat arbitrary, and the actual physical structure for one or more boards can be implemented as a single plug-in printed circuit card residing in a connector socket or slot on a larger cabinet-based motherboard.

Also interconnected with the parent bus pair MBA and MBB are a pair of redundant system management modules (SMMs) identified herein as SMMA 128 and SMMB 130. Each SMM is a microprocessor-based component. The SMMs 128 and 130 each reside on a PCI bus 132 and 134. The SMM performs a variety of functions and includes both Ethernet and modem capabilities allowing it to interconnect with the computer operating system and other network communication structures (block 136). The SMM may also include other unrelated system components such as a video driver chip. The SMM is particularly based around a Motorola Power PC™860T microprocessor utilizing the is VxWorks real-time operating system available from Wind River Systems, Inc. of Alameda, Calif. The term "system management module" (or SMM) is defined broadly to include any acceptable device for driving commands on the maintenance bus arrangement. While a microcontroller described above is used in a preferred embodiment, the SMM can be an application specific integrated circuit (ASIC), a programmable logic array, a microprocessor unit or any other command originator interconnected with the maintenance bus arrangement. The term "command module" is also used to define the SMM in its various possible embodiments.

Each SMM includes a pair of I²C buses 138 and 140. Each pair is connected with a respective bus from the parent bus pair MBA and MBB. The SMMs are configured to operate in failover mode. In other words, SMMA operates under normal circumstances. In this mode SMMB monitors and communicates with SMMA over the shared I²C bus, ready to take over for SMMA if it fails. If a failure is detected, then SMMB takes over operation but is otherwise largely idle, during normal run time. The function of the SMMs is described in further detail below. In summary, the SMMs carry information about components on each of the board assemblies 102, 104 and 106. The SMMs use this information to monitor and generally control the board assemblies. This information may be transferred to other parts of the computer system and over a network via the PCI bus.

Each parent board 112, 114 and 116 includes various data processing, display and communication capabilities in accordance with its purpose. Each board 112, 114 and 116 also includes a respective CPU (CPU1, CPU2 and CPU3) 152, 154 and 156, respectively. Each CPU can comprise an Intel Pentium III™, Xeon™ or any other acceptable microprocessor having I²C or equivalent maintenance bus architecture. Each board 112, 114 and 116 is interconnected with the parent buses MBA and MBB at various interconnection points, where appropriate. Since the parent bus is amplified by a gain by approximately ten times the normal I²C operating level, interconnections with the parent buses can be made via bus extenders to be described further below.

Each parent board 112, 114 and 116 also includes a pair of interconnections 160 and 162 with each of the respective parent maintenance buses MBA and MBB. The interconnections 160 and 162 link to respective bridges 192 and 194. These bridges, in turn interconnect with respective child maintenance buses CB1, CB2 and CB3 to interconnect child board components. On each child board 122, 124 and 126 resides various control and monitoring subsystem components 172, 174 and 176, respectively. The subsystem components are described in further detail below. These components are each in communication with the maintenance bus using the preferred I²C standard. The interconnection between each parent board and child board occurs via a pair of bridges 192 and 194. Each bridge is essentially identical in architecture, each pair of bridges 192 and 194 has the same different address for communication with the SMMs. The address of the bridge pair on each board, however, differs so that the SMM can uniquely address a specific board. Addresses are established based upon the pin and socket arrangement for the respective bridge. It is useful to assign the same address to both bridges 192, 194 in the pair since they each reside on a different bus (MBA or MBB). For a given transaction, the SMM utilizes only one of the two bridges on a parent board to accomplish a task. The other, unused bridge in the pair can be used if the SMM cannot complete the transaction with the original bridge. The SMM uses the other parent maintenance bus to access the other, previously unused bridge. As noted above, in order provide an amplified parent bus signal and an appropriate signal level to the subsystem bridges, bus extender hardware is in employed. The bus extender hardware is available from Phillip Semiconductors under part number 82B715. Using amplified parent buses, approximately thirty or more loads can be carried. The extender acts as a buffer for signals traversing the extender hardware providing the necessary amplification and deamplification. Extender components 196 are provided between the parent buses MBA and MBB and corresponding bridge interconnections 160 and 162. While not shown, interconnections 160 and 162 can also include appropriate series resistors and FET triggers in line with the extender components 196 in accordance with the 82B715 hardware manufacturer's data sheet.

The bridges 192 and 194 each act as store-forward devices in the transfer of I²C signals into and out of the child board subsystem. In other words, the bridges receive packetized signals from the SMMs and transfer them to appropriate I²C-compatable maintenance bus ports on subsystem components. Likewise, the bridges receive signal from subsystem components and transfers them back to the SMMs. In order to provide desired fault-tolerance, two bridges 192 and 194 are employed, each communicating with one of the dual parent buses MBA and MBB. In this manner, the failure of a single bridge or parent bus does not cause a lost of connection between the subsystem components and SMMs. This is because each child bus CB1, CB2 and CB3 is interconnected with both bridges simultaneously. The subsystem components are accessed via the child bus. A reset connection (R1, R2 and R3) and power connection (P1, P2 AND P3) extend from each bridge in the pair. A reset and/or power command from an SMM to the active bridge in the pair is used to power-up or reset the underlying board assembly. The SMMs are configured to provide independent reset and power commands to the bridges 192 and 194, to allow powering and reset of each underlying board through the maintenance bus arrangement. In general the active bridge performs power-up. However, the bridges are configured to handshake, or otherwise communicate, to ensure that the board hardware is functioning properly before power-up occurs generally within the board.

According to a preferred embodiment, each bridge 192, 194 comprises a commercially available Intel 87C54 microcontroller. This circuit package includes a built-in programmable storage device (an erasable programmable read-only memory EPROM) and 256 bytes of random access memory (RAM). This package is relatively low-cost and complete. Data traveling over the I²C bus is buffered in the RAM while basic routing and power control functions are preprogrammed into the bridge microcontroller EPROM. Though the 87C54 is the preferred embodiment, any microcontroller with sufficient I/O ports to drive both parent and child maintenance buses could instantiate the bridges 192 and 194.

Figure 2:
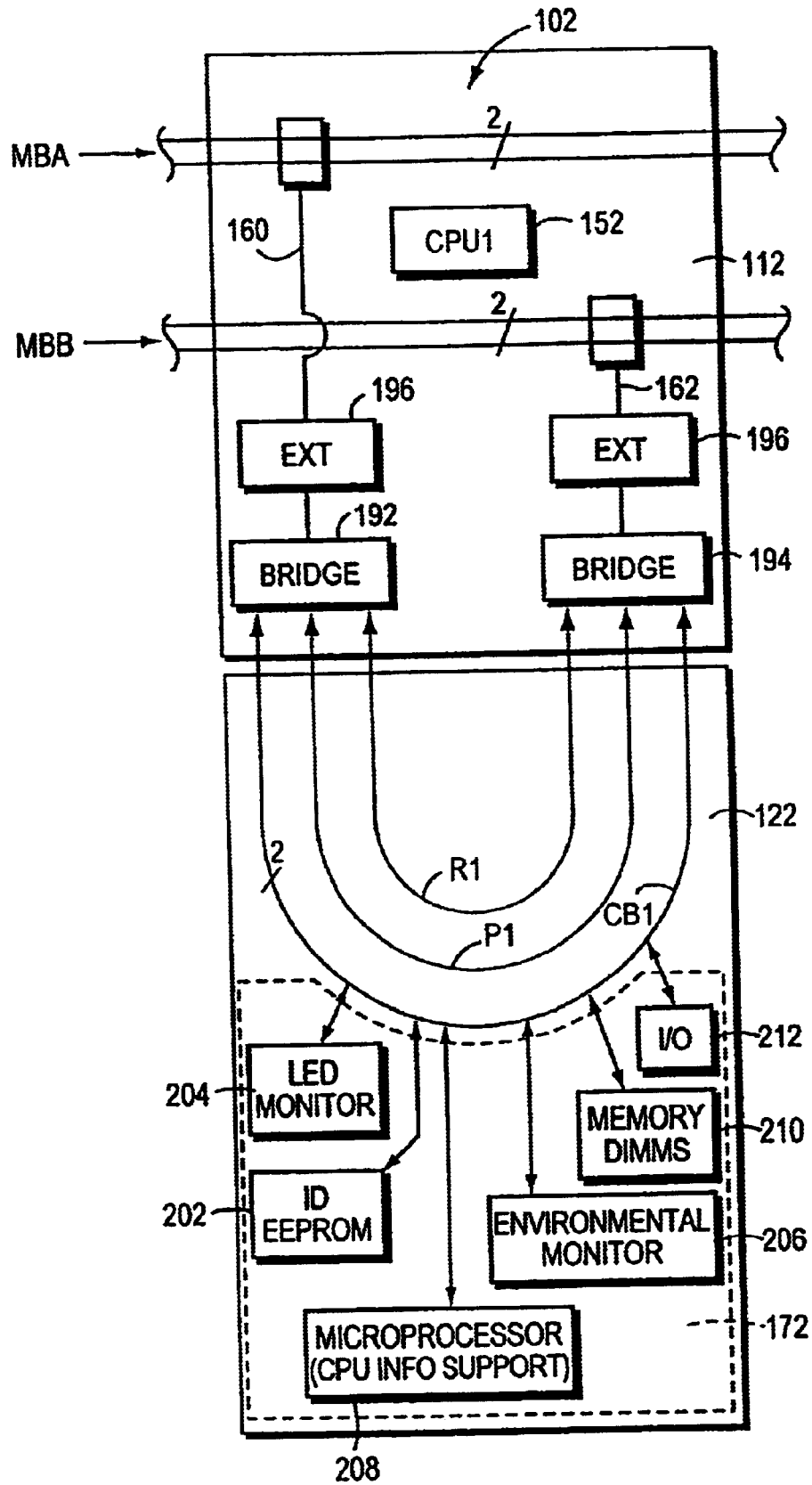
FIG. 2 is a more detailed block diagram showing one parent and child printed circuit board implementing a fault-tolerant maintenance bus according to this invention.

With further reference to FIG. 2, the exemplary parent board assembly 102 is shown in further detail. Particularly, the subsystem components 172, interconnected with the I²C bus are illustrated. The electrically erasable programmable read only memory (EEPROM) carrying the board identification (ID), generally termed the IDEEPROM 202, is provided on the bus. In addition, a light-emitting diode (LED) monitor 204 is provided. This LED provides a visible indication of the status of the board for an operator of the board. In addition, an environmental monitor chip 206 having I²C compatibility is provided. This chip typically monitors temperature and other important functions and transmits appropriate data and/or alarms regarding environment. Microprocessor information from CPU 1(152) is also interconnected with the bus CB1 vi an I²C interconnection. The CPU support information 208 is transmitted over the I²C bus, as well as other important status data. I²C interconnections with the dual inline memory module sockets (DIMMS) 210 of the board assembly are also provided by the child bus CB1. In addition, other I/O ports 212 with I²C capabilities may be serviced by the child bus CB1.

Having described the architecture of the maintenance bus arrangement, the protocol operating thereon is now described in detail. It is contemplated that the SMMs communicate with the bridges 192 and 194 via data packets, sent over the I²C bus with appropriate destination addresses. In general, each bridge and subsystem component contains its own unique address on the maintenance bus that make it identifiable by the SMMs. The SMMs have knowledge of the subsystem components on each board. Packets sent to and from the SMM have the bridge identification and the data within the packet is used to identify the particular subsystem device. A variety of protocols and communication techniques can be used according to this invention. Heretofore, I²C connections have operated using a highly simplified communication scheme without the benefit of addressing and protocol techniques. Because of the fault-tolerant nature of the bus arrangement and bridge system, addressing of control and monitor functions between the SMMs and the appropriate bridge are highly desirable.

Figure 4:
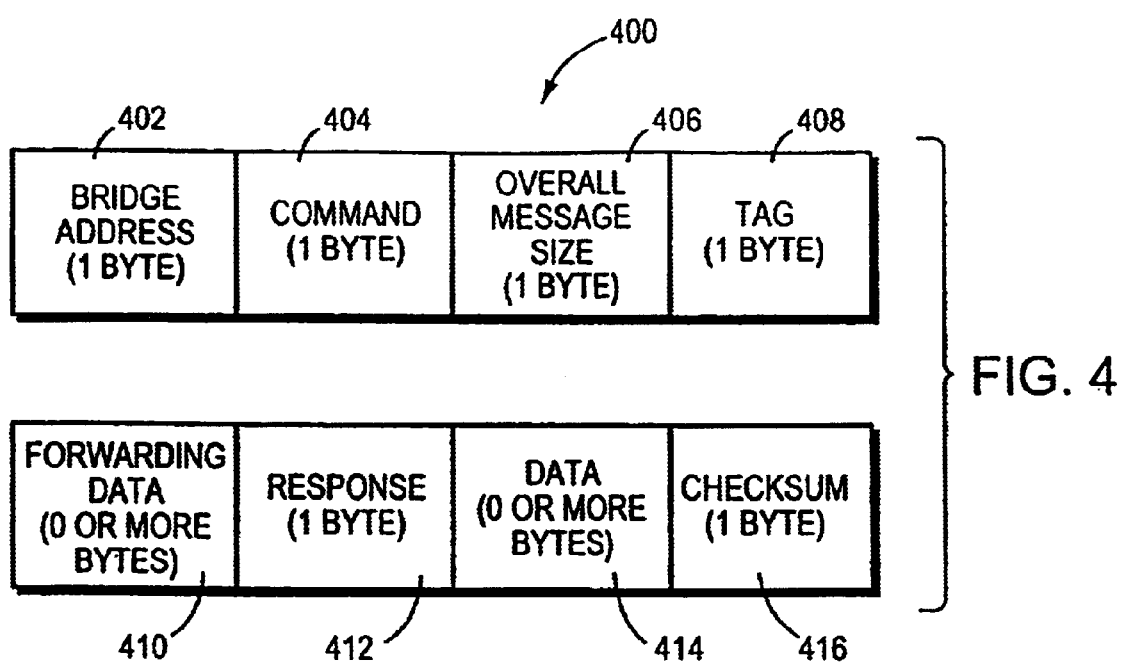
FIG. 4 is a block diagram of the protocol's command message/data packet according to an embodiment of this invention.

Referring to FIG. 4, a command message/data packet structure 400 is shown schematically. While the illustrated message 400 is a command message initiated by the SMM, the packet structure to be described is generally a two-way message structure in which command versus response messages are differentiated by a unique command designator/identifier byte within the message header.

The command data packet 400, which is transferred between the SMM and the various subsystem components, includes an address header 402. This header is typically limited to one byte of information. In general, the architecture is arranged so that one byte (six address bits, one parity bit and one read/write bit) is sufficient to direct the packet to an appropriate bridge and corresponding subcomponent. In particular, the address specifies the target bridge through which data is transferred. As described further below, the final delivery of a command to a specific subcomponent is facilitated by the data bytes of the packet.

Following the address header 402, a command byte 404 is provided. Specifically, if the transferred packet is a command packet from the SMM, the command byte is enabled with a specific recognized command byte code. The command bytes direct a particular subsystem component to perform a particular action, cause a bridge to perform a power or reset function, or to cause a subordinate bridge to perform a forwarding operation (described further below). The following is an exemplary list of command codes:

| Command | Code |
| --- | --- |
| I am a Response Stage | 0x00 |
| I am a General Call | 0x01 |
| Perform I²C Read | 0x02 |
| Perform I²C Write | 0x03 |
| Perform I²C Write & Read | 0x04 |
| I am an SM Bus Read | 0x05 |
| Perform I²C Port Set | 0x06 |
| Perform I²C Port Clear | 0x07 |
| Perform I²C Port Toggle | 0x08 |
| Perform I²C Parallel Data Read | 0x09 |
| Perform I² Parrallel Data Write | 0x0a |
| Perform I²C Parallel Command Read | 0x0b |
| Perform I²C Parallel Command Write | 0x0c |
| reserved for future expansion | 0x0d–0x0f |
| Ping Bridge | 0x10 |
| Report Bridge Information | 0x11 |
| Report Bridge Down Bus Statistics | 0x12 |
| Report & Clear Bridge Down Bus Statistics | 0x13 |
| Report Bridge Up Bus Statistics | 0x14 |
| Report and Clear Bridge Up Bus Statistics | 0x15 |
| Report I²C Down Bus Statistics | 0x16 |
| Report & Clear I²C Down Bus Statistics | 0x17 |
| Report I²C Down Up Bus Statistics | 0x18 |
| Report & Clear I²C Up Bus Statistics | 0x19 |
| reserved for future expansion | 0x1a–0x1f |
| Reset Assembly | 0x20 |
| Generate NMI to Assembly | 0x21 |
| Power Off Board Assembly | 0x22 |
| Power On Board Assembly | 0x23 |
| Reset Other Bridge | 0x24 |
| Hold Board Assembly in Reset | 0x25 |
| Release Board Assembly from Reset | 0x26 |
| reserved for future expansion | 0x27–0x2f |
| Initialize Search | 0x30 |
| Report Next Bridge | 0x31 |
| Bridge Found | 0x32 |
| Watch Child For Info | 0x33 |
| reserved for future expansion | 0x34–0x3f |
| Prepare New Search | 0x40 |
| Who's Out There? | 0x41 |
| Remember Info | 0x42 |
| reserved for future expansion | 0x43–0x4f |
| Dump State History | 0x50 |
| Resend Last Response Stage | 0x51 |
| Unfreeze History Log | 0x52 |
| reserved for future expansion | 0x53–0xff |

The foregoing list of commands is only exemplary, and is specifically adapted to an I²C standard application. Where the standard and available subcomponents vary from those described herein a different set of commands may be appropriate.

Following the command byte, is a one-byte number designating the overall message size 406. The overall message size is indicated as a number of bytes by the one-byte string.

Next, a tag byte 408 is provided to the header packet. This tag byte is generated by the originator (the SMM) of the data packet. It is a unique one-byte number. The tag byte is repeated in a response message, as described below. In other words, when a message is originated and transferred to a subsystem, the appropriate response sent by the subsystem component should include the same tag byte, indicating that the message was received properly and acted upon. If the tag byte is not received, then an error has occurred an appropriate action is taken by the SMM.

Figure 3:
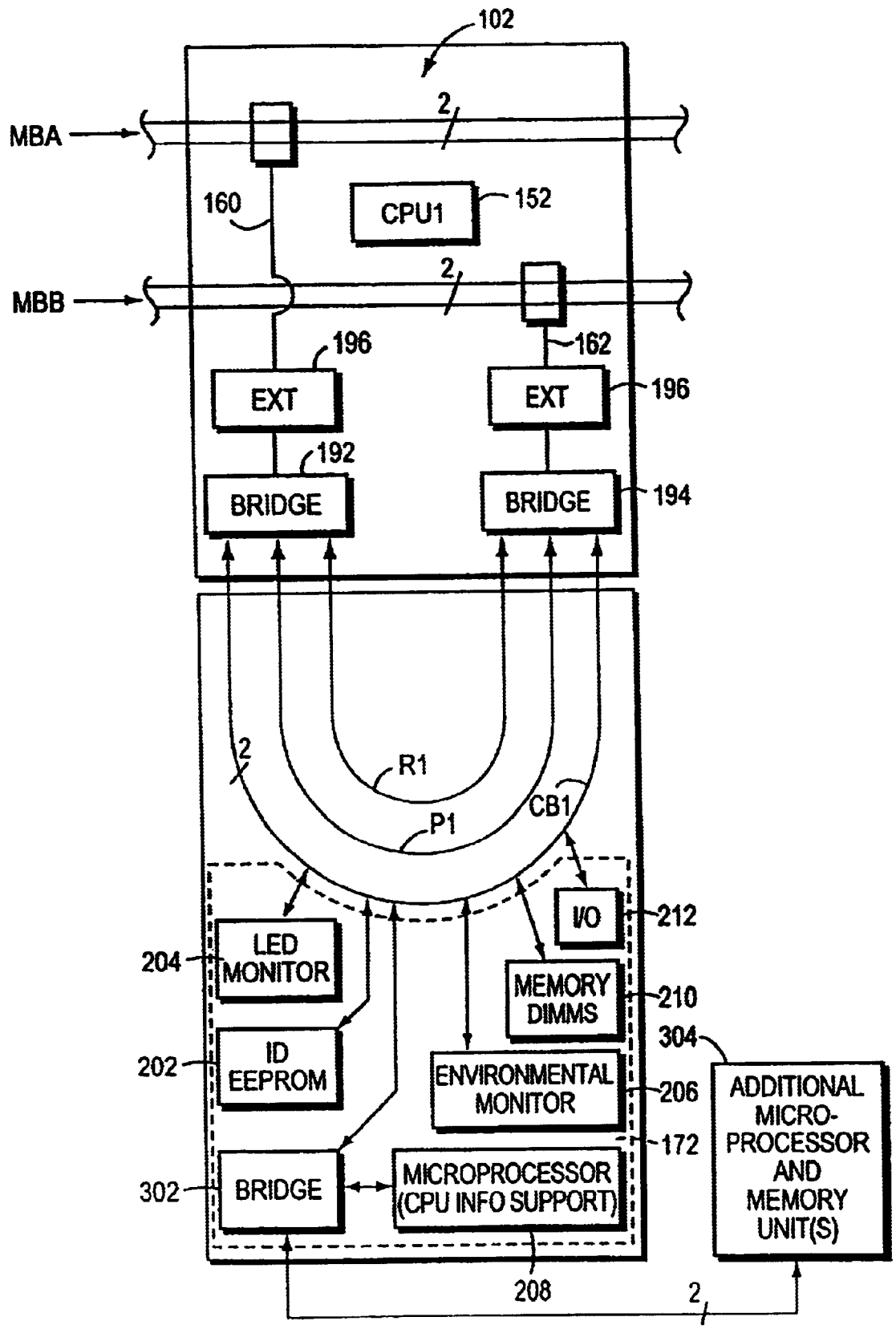
FIG. 3 is the board of FIG. 2 including a bridge for accessing a remote microprocessor board according to an alternate embodiment.

Next, one or more bytes of forwarding data 410 are provided. The forwarding data enables a hierarchy of bridge structures to be established within the child bus. In connection with the forwarding data 410, reference is also made to FIG. 3, which again illustrates the exemplary board assembly 102. The subsystem 172 of this board includes the set subsystem components described above with reference to FIG. 2. In addition, another bridge 302 (FIG. 3) is interconnected with the child bus CB1. This bridge is similar in configuration to the bridges 192 and 194, and can be constructed from the same type of microcontroller circuit. The bridge 302 includes another discrete address that is recognized by the SMM so that data is transferred via the bridge 192, 194 to the subordinate bridge 302 as if it were any travelling to any other subsystem component. The packet structure according to this embodiment enables a large number of remote components to be accessed notwithstanding the relatively small (one-byte) address 402.

With reference again to FIG. 3, once a command message packet is received, the subordinate bridge 302 stores and forwards the message to the I²C-compatable ports on further computer circuitry 304. Note that the CPU information block 208 is connected through the subordinate bridge 302 according to FIG. 3. According to this embodiment, the processor information is located behind the child bridge, accounting for the depicted arrangement. In this example, the circuitry 304 includes another microprocessor (such as an Intel Xeon™) and/or associated memory and other peripherals. The above-described protocol enables messages to be transferred from the child bus through bridges to additional, subordinate bridges (such as bridge 302). Further components, such as circuitry 304, can be accessed through these subordinate bridges. The subordinate bridge acts as a hierarchy to access the remote microprocessor circuitry 304 given the limited addressing available for the protocol. In this sense, the circuitry 304 is invisible to the child bus CB1. Based upon the above-described structure a series of subordinate bridges can be chained in series. Each subordinate bridge uses response data in the command message to route a received response back up the hierarchy of bridges to the originating SMM.

Each bridge in the bridge hierarchy stores knowledge of the message transferred therefrom. The response field 412 is stripped and stored by each bridge along the pathway, and the bridge's own field is substituted. This enables responses to command messages to return to their source (SMM) after passing back from the subordinate location through the bridge system.

Referring again to the command data packet 400 of FIG. 4, the structure includes zero or more bytes of data 414, following the response byte field 412. In general, data is provided as part of a particular transaction under the I²C protocol. This data is subcomponent-specific. In addition, the data provides the identification of a particular component on the child bridge, or in a remote, subordinate bridge hierarchy (such as the circuitry 304).

Finally, the command packet 400 includes a checksum 416 comprising a one-byte number. The checksum 416 indicates the sum of previous bytes in the message. If either the bridge, or a SMM discovers an incorrect checksum byte in a message, then the message is discarded. An erroneous message can trigger a variety of actions, including resending of the message, an alarm condition or shut down as appropriate. Note that at least two error modes for the SMM exist: (1) where it receives no response following the transmission of a message, resulting in "time-out" state; and (2) an error state in which a message is returned that is properly formatted, but is not understood by the bridge or the SMM as applicable. One possible corrective action is to retry sending of the message for a predetermined number of times. Certain subsystem devices that must return date, require a positive response, and thus, a full-way communication is required for an error not to occur. Conversely, where a power-on command is sent by the SMM or another non-response-dependent action occurs within the subsystem, then failure to return a response may cause an indication that an error may be present, but the action is possibly completed. These conditions are described further with respect to the response phase that is now discussed in detail.

Figure 5:
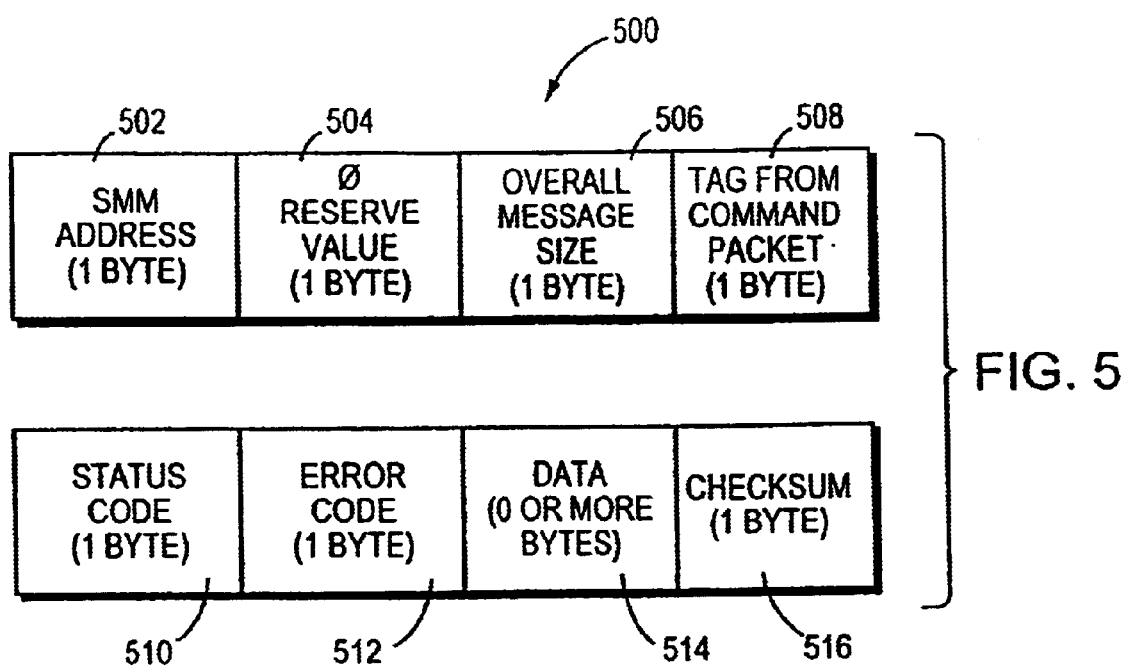
FIG. 5 is a block diagram of the protocol's response message/data packet according to an embodiment of this invention.

The response message/data packet 500 is shown in FIG. 5. It includes a one-byte address 502 designating the SMM. Where the command packet contains a command byte (404), the response packet contains a reserve value 504, generally equal to zero. This, in fact, indicates that a response is being transferred over the maintenance bus.

The response packet 500 also includes an overall message size 506 similar to the command message size 406. The tag 508 of the packet 500 is the original tag (408) in the command message, now being returned by subsystem components. Next is provided a one-byte status code 510. The status code, as described above, is an indicator that a problem may exist, but the system does not have confirmation. For example, power may have been turned on, but no response is given. Different potential problems may be indicated by different status codes. In general, the status code is appended to the response by the active bridge.

If the command is, however, misunderstood or improperly formatted, then an appropriate error code 512 is generated. The absence of an error is generally indicated by a zero value. Conversely, the specific errors are indicated by particular byte codes. Exemplary error codes are listed in the following table:

| | |
|---|---|
| success (0x00) | No error was detected in the transmission and execution of a protocol command. Any data bytes in the response structure are valid. |
| unexpected event (0x01) | The reporting bridge encountered a firmware bug while processing the command. The bridge's currently active finite state machine was driven with an event type which the firmware designer did not account for. The event freezes the bridge's history log. |
| invalid_structure_length (0x02) | The size field in the write stage structure was incorrect for the requested command. |
| invalid_checksum (0x03) | A bad checksum was specified for the command. This code is invisible to originators, because bridges simply NAK the checksum byte when it's incorrect (rather than send back a response stage to a potentially wrong response target address). |
| cmd_unsupported (0x04) | The command is a valid protocol command, but it is not supported by the reporting bridge. |
| cmd_unknown_type (0x05) | The command is not a valid protocol command. |
| response_stage_failed (0x06) | Couldn't send the response stage to the response target. Not usually visible to the originator. |
| i2ccmd_unsupported (0x07) | The command is a valid protocol standard I²C command, but it is not supported by the reporting bridge. |
| i2ccmd_unknown_type (0x08) | The firmware's standard I²C command state machine was passed a command which is an incorrect type. This error means that the reporting bridge has encountered a firmware bug. This event freezes the bridge's history log. |
| i2ccmd_bad_struct_length (0x09) | The length of the protocol write stage structure is not correct for the specified standard I²C command. |
| i2ccmd_bad_read_length (0x0a) | The requested number of bytes to read was too large to be able to fit into a protocol response stage structure. |
| i2ccmd_bad_read_addr (0x0b) | The low-order bit in the slave address for a requested I²C read (or write & read) is not correct, i.e., it's not a read address. |
| bridge_retry_max_exceeded (0x0c) | The reporting bridge exceeded its aggregate retry count (20 attempts, currently) while trying to master a transmission of a SIP structure. This is a generic error which |

-continued

| | |
|---|---|
| power_fault_detected (0x0d) | can occur when several different types of errors have happened, but none of the specific error count thresholds has been exceeded. After applying power to the assembly (in response to a Power-on Assembly command), a power fault was detected from the assembly's power controller. This is returned as a status code rather than an error code, since not all assemblies support proper power fault detection. |
| i2c_bus_busy (0x0e) | A busy condition prevented the reporting bridge from being able to master a transaction on an I²C bus. I.e., the data and clock wires for the bus were not high (idle) for a long enough period for the bridge to be able to commence a START condition. |
| lost_i2c_arbitration (0x0f) | Arbitration was lost while mastering a transaction on an I²C bus. Either another master or an electrical problem on the bus grounded the data wire while the bridge let it float during a bit transmission. |
| no_i2c_slave_ack (0x10) | No acknowledge was seen after transmission of the slave address byte (first byte of an I²C transaction). This error means that the reporting bridge received no response from an addressed I²C target. This could be because the bus has glitched. It could also occur if the target has failed, has been removed, or (if the target is a bridge) is busy processing a previously received command. |
| i2c_bit_stretch_timeout (0x11) | The I²C clock line was held low for too long between bit transmissions. |
| no_i2c_byte_ack (0x12) | No acknowledge was detected or generated after an I²C byte transmission. Several other error codes offer more specific information about which byte was dropped, but this is a catch-all which is used when a dropped byte has no special semantics from the bridge's point of view. |
| i2ccmd_bad_write_addr (0x13) | The low-order bit in the slave address byte of a requested I²C write is incorrect, i.e., it's not a write address. |
| response_stage_seen (0x14) | The command byte in a expected protocol write stage structure is incorrect, and indicates that the structure is really a response stage structure. |
| no_checksum_byte_ack (0x15) | An acknowledge was not received by the reporting bridge after the checksum byte was sent during a protocol transmission. This error generally indicates that an incorrectly formatted write stage structure was produced by the originator. However, it could also indicate a transmission error. |
| no_resp_stage_target (0x16) | No response stage target address was found within the write stage structure. I.e., the firmware did not find a byte with the low-order (read/write) bit set to 1 between the tag byte and the checksum (final) byte. |
| bad_ack_control (0x17) | The reporting bridge encountered a firmware bug while the processing the command. A bad control value was passed into the firmware's I²C slave or master read state machine by its caller. This control value is used to instruct the state machine on the conditions it should use to decide whether or not a byte should be acknowledged. This failure freezes the state history log. |
| i2c_high_clock_timeout (0x18) | When acting as a slave for an I²C transaction, The I²C clock line was idle for too long between bit transmissions. Generally, the bridge firmware waits for a master to drive the clock low so that the bridge can commence bit-stretching (i.e., it will also drive the clock low). However, if the |

-continued

| | |
|---|---|
| | master doesn't give a low clock in a certain amount of time, the bridge assumes it has lost contact with the master. |
| no_i2c_start_seen (0x19) | No START condition was detected on the I²C bus when one was expected. |
| no_sip_command_ack (0x1a) | No acknowledge was received after the transmission of the command byte in a protocol structure. |
| no_sip_size_ack (0x1b) | No acknowledge was received after the transmission of the size byte in a protocol-structure. |
| no_sip_tag_ack (0x1c) | No acknowledge was received after the transmission of the tag byte in a protocol structure. |
| resp_data_too_big (0x1d) | A response stage structure has been generated by a bridge which exceeds protocol limits. |
| stats_unsupported (0x1e) | The command is a valid bridge statistics request command, but it is not supported by the reporting bridge. |
| stats_unknown_type (0x1f) | The firmware's statistics state machine was passed a command which is an incorrect type. This error means that the reporting bridge has encountered a firmware bug. This event freezes the bridge's history log. |
| stats_bad_struct_length (0x20) | The write stage structure, which contains a valid bridge statistics request command, is not the correct length. |
| local_unsupported (0x21) | The command is a valid bridge local command, but it is not supported by the reporting bridge. |
| local_unknown_type (0x22) | The firmware's local command state machine was passed a command which is an incorrect type. This error means that the reporting bridge has encountered a firmware bug. This event freezes the bridge's history log. |
| local_bad_struct_length (0x23) | The write stage structure, which contains a valid bridge local command, is not the correct length. |
| xint_source_signal_stuck_low (0x24) | A transition from low to high was expected on a signal which the bridge released (i.e., it stopped grounding it, but the signal did not go high). This signal is used b the reporting bridge to inform its peer subsystem bridge of the action it should take. Several commands require the cooperation of both bridges in an I²C subsystem in order to carry out an action, and "source" signals are utilized in conjunction with a cross-interrupt mechanism to synchronize the bridges. Source signals are routed between two subsystem bridges only. |
| target_signal_stayed_low (0x25) | A transition from low to high was expected on a signal which the bridge released (i.e., it stopped grounding it, but the signal didn't go high). A "target" signal is one of the signals that both subsystem bridges use to control surrounding hardware on an assembly - such as assembly reset, power enable, or NMI. |
| xint_source_signal_stuck_high (0x26) | A transition from high to low was expected on a signal which the bridge is now grounding. This signal is used by the reporting bridge to inform its peer subsystem bridge of the action it should take. Several commands require the cooperation of both bridges in an I²C subsystem in order to carry out an action, and "source" signals are utilized in conjunction with a cross-interrupt mechanism to synchronize the bridges. Source signals are routed between two subsystem bridges only. The stuck high error should be impossible given the bridge's microcontroller hard- |

-continued

| | |
|---|---|
| other_bridge_nor_driving (0x27) | ware, but the firmware tests the signal for this condition as a sanity check. This error would indicate a fault in the microcontroller, whereas the stuck low error can have other causes.<br>Just prior to driving a target signal low (to ground), the firmware first verifies that the other bridge has driven the signal low first.<br>The other bridge is expected to do this after processing a cross-interrupt. This error indicates that, despite a successful cross-interrupt handshake, the other bridge has not grounded the target signal. |
| target_signal_stayed_high (0x28) | As in xint_source_signal_stayed_high (above), this is potentially an impossible error, since the bridge microcontroller should not be able to detect a high state when it's driving low (to ground). Analogous to xint_source_signal_stuck_high, except that it applies to a target signal, which controls surrounding hardware. |
| already_driving_xint (0x29) | Just prior to performing a cross-interrupt to the other subsystem bridge, the reporting bridge discovered that the cross-interrupt signal was already asserted. |
| intack_already_driven (0x2a) | Just prior to performing a cross-interrupt to the other subsystem bridge, the reporting bridge discovered that the interrupt acknowledge signal was already asserted. |
| no_intack from_other_ bridge (0x2b) | The other bridge didn't respond to a cross-interrupt request. |
| vsize_unsupported (0x2c) | The command is a valid visible bridge sizing command, but it is not supported by the reporting bridge. |
| vsize_unknown_type (0x2d) | The firmware's visible sizing command state machine was passed a command which is an incorrect type. This error means that the reporting bridge has encountered a firmware bug. This event freezes the bridge's history log. |
| vsize_bad_struct_length (0x2e) | The write stage structure, which contains a valid visible sizing command, is not the correct length. |
| vsize_not_sizing_bridge (0x2f) | A Bridge Found command was unexpectedly received by the reporting bridge because it had not previously been sized. |
| no_response_stage_desired (0x30) | Not visible to originator. This code is used internally in the bridge to track the case where the originator did not want a response stage generated for its command. |
| restrict_response_retries (0x31) | Not visible to originator. This code is used internally in the bridge firmware to track when a restricted number of retries (currently 1) is to be used for a given response stage transmission. |
| isize_unsupported (0x32) | The command is a valid protocol inter-bridge sizing command, but it is not supported by the reporting bridge. |
| isize_unknown_type (0x33) | The firmware's inter-bridge sizing command state machine was passed a command which is an incorrect type. This error means that the reporting bridge has encountered a firmware bug. This event freezes the bridge's history log. |
| isize_bad_struct_length (0x34) | The write stage structure, which contains a valid inter-bridge sizing command, is not the correct length. |
| init_alt_i2c_unsupported (0x35) | In the bridge, an input pin is used to determine whether the hardware supports I²C or not. All I²C support is performed in the bridge firmware. |

-continued

| | |
|---|---|
| stats_bad_dump_size (0x36) | The requested number of bytes to dump for the Dump State History command was invalid (probably too many bytes for a response stage to return). |
| (0x37–xff) | Unused/Spare. |

Referring further to FIG. 5, the response packet 500 next includes zero or more bytes of response data 514. This data can comprise environmental telemetry or variety of other required response data from the selected subsystem components. Finally, a check-sum byte 516 is provided. This checksum, again indicates the sum of the previous bytes in the response message. If the SMM or a bridge discovers an incorrect checksum, then the response is discarded and the command-response cycle is generally retried (or other appropriate action is taken).

It should now be clear that the foregoing architecture and accompanying protocol enables an effective and low-cost technique for implementing a fault-tolerant maintenance bus within a number of separate computer components.

The foregoing has been a detailed description of a preferred embodiment. Various modifications and additions can be made without departing from the spirit and scope of the invention. For example, while the maintenance bus is implemented as an I²C standard, it can be implemented in any other acceptable standard and the number of lines in the bus can be varied from the two lines shown. While a serial maintenance bus is utilized, it is contemplated that a parallel bus can be employed according to an alternate embodiment. Various components such as bridges and SMMs can be implemented using a variety of commercially available and customized circuits. Accordingly, this description is meant to be taken only by way of example, and not to otherwise limit the scope of the invention.

What is claimed is:

1. A fault-tolerant maintenance bus protocol for communicating between a command module located on a parent maintenance bus and a plurality of subsystem components joined together on a child maintenance bus, wherein the child maintenance bus is interconnected to a bridge assembly that directs messages formatted in the protocol between the subsystem components and the command module through the bridge, the protocol comprising:

a command message structure that uniquely addresses the bridge assembly, and that includes a command string, a command data string for communicating with one of the subsystem components, a tag uniquely identifying a packet, and a command error-checking string; and a response message structure that uniquely addresses the command module, and that includes error and status strings with respect to execution of the command message, the error string including an error code for identifying a specific error, the response message structure further including a response data string for communicating with the command module, and a response error-checking string.

2. A fault-tolerant maintenance bus protocol for communicating between a command module located on a parent maintenance bus and a plurality of subsystem components joined together on a child maintenance bus, wherein the child maintenance bus is interconnected to a bridge assembly that directs messages formatted in the protocol between the subsystem components and the command module through the bridge, the protocol comprising:

a command message structure that uniquely addresses the bridge assembly, and that includes a command string, a command data string for communicating with one of the subsystem components and a command error-checking string, the command string positioned on the structure directly following a bridge address string;

a response message structure that uniquely addresses the command module, and that includes error and status strings with respect to execution of the command message, a response data string for communicating with the command module and a response error-checking string; and a response string directly following a command module address string, the response string having a unique value indicative of a response message structure.

3. The protocol as set forth in claim 2 wherein the plurality of subsystem components are contained on a circuit board having a plurality of components, the circuit board being located on the parent maintenance bus and the command string includes command information formatted to instruct the bridge to power-up the plurality of components on the circuit board.

4. The protocol as set forth in claim 3 wherein the command data string includes command instructions formatted for one of the subsystem components.

5. The protocol as set forth in claim 4 wherein the response data string includes information provided by one of the subsystem components.

6. The protocol as set forth in claim 5 wherein the status and error strings include codes specifying erroneous conditions in execution of the command string.

7. The protocol as set forth in claim 6 wherein the command error-checking string and the response error-checking string each include an identical tag string, the tag string being initially provided by the command module in the command message structure and being returned by the bridge in the response message structure.

8. The protocol as set forth in claim 7 wherein the command error-checking string and the response error-checking string each include a checksum string indicative of a total length of the command message structure and the response message structure respectively.

9. The protocol as set forth in claim 6 wherein the bridge address string is adapted to address one of either the bridge or another bridge residing on the circuit board thereon each of the bridge and the other bridge being joined to the child bus and each of the bridge and the other bridge having the same address.

10. The protocol as set forth in claim 9 wherein each of the command message structure and the response message structure are adapted to travel between the command module and the other bridge over another parent maintenance bus connected to the other bridge.

11. The protocol as set forth in claim 6 wherein the response string provides the bridge with address data for directing the response message structure.

12. The protocol as set forth in claim 11 wherein the command data string includes information for identifying a subordinate bridge in the child maintenance bus, whereby the command message structure is routed through the subordinate bridge to remote circuitry.

13. A method for using a fault-tolerant maintenance bus protocol for communicating between a command module located on a parent maintenance bus and a plurality of subsystem components joined together on a child maintenance bus, wherein the child maintenance bus is interconnected to a bridge assembly that directs messages formatted in the protocol between the subsystem components and the command module through the bridge, the method comprising the steps of:

transmitting, from the command module, a command message structure that uniquely addresses the bridge assembly, and that includes a command string, a command data string for communicating with one of the subsystem components, a tag uniquely identifying a packet, and a command error-checking string; and transmitting, from the bridge, a response message structure that uniquely addresses the command module, and that includes error and status strings with respect to execution of the command message, the error string including an error code for identifying a specific error, the response message structure further including a response data string for communicating with the command module, and a response error-checking string.

14. A method for using a fault-tolerant maintenance bus protocol for communicating between a command module located on a parent maintenance bus and a plurality of subsystem components joined together on a child maintenance bus, wherein the child maintenance bus is interconnected to a bridge assembly that directs messages formatted in the protocol between the subsystem components and the command module through the bridge, the method comprising the steps of:

selectively transmitting, from the command module, a command message structure that uniquely addresses the bridge assembly, and that includes a command string, a command data string for communicating with one of the subsystem components and a command error-checking string;

providing within the command message structure an address string that identifies each of the bridge and the other bridge; and transmitting, from the bridge, a response message structure that uniquely addresses the command module, and that includes error and status strings with respect to execution of the command message, a response data string for communicating with the command module and a response error-checking string, wherein the command message structure and the response message structure are transmitted over one of either the parent maintenance bus to the bridge or to another parent maintenance bus to another bridge, each of the bridge and the other bridge being interconnected to the child maintenance bus.

15. The method as set forth in claim 14 further comprising providing information with respect to a selected one of the subsystem components in the command data string and the response data string.

16. The method as set forth in claim 15 wherein the step of transmitting command message structure includes providing the bridge with address data in the response string for subsequent directing the response message structure.

17. The method as set forth in claim 16 further comprising providing, in the command data string, information for identifying a subordinate bridge in the child maintenance bus, whereby the command message structure is routed through the subordinate bridge to remote circuitry.

* * * * *